(12) United States Patent
Hoogenboom et al.

(10) Patent No.: US 12,536,284 B2
(45) Date of Patent: Jan. 27, 2026

(54) SYSTEM AND METHOD FOR DETECTING AND/OR BLOCKING MALWARE ATTACKS USING DECOYS

(71) Applicant: Battelle Memorial Institute, Columbus, OH (US)

(72) Inventors: Gabe Hoogenboom, Iron River, MI (US); Jeffrey A. Lau, Fairfax, VA (US)

(73) Assignee: Battelle Memorial Institute, Columbus, OH (US)

( * ) Notice: Subject to any disclaimer, the term of this patent is extended or adjusted under 35 U.S.C. 154(b) by 169 days.

(21) Appl. No.: 18/474,349

(22) Filed: Sep. 26, 2023

(65) Prior Publication Data

US 2024/0111871 A1 Apr. 4, 2024

Related U.S. Application Data

(60) Provisional application No. 63/377,845, filed on Sep. 30, 2022.

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .......... G06F 21/566; G06F 2221/034
See application file for complete search history.

(56) References Cited

U.S. PATENT DOCUMENTS

| | | | | |
|---|---|---|---|---|
| 9,418,222 B1* | 8/2016 | Rivera | .......... | G06F 21/554 |
| 10,193,918 B1* | 1/2019 | Patton | .......... | G06F 21/566 |
| 10,834,130 B2* | 11/2020 | Erez | .......... | G06F 21/554 |
| 11,645,383 B2* | 5/2023 | Guri | .......... | G06F 21/54 |
| | | | | 726/22 |
| 2006/0206873 A1 | 9/2006 | Argade | | |
| 2018/0189490 A1* | 7/2018 | Maciejak | .......... | G06F 21/566 |
| 2019/0332766 A1 | 10/2019 | Guri et al. | | |
| 2021/0312046 A1* | 10/2021 | Hicks | .......... | G06F 21/566 |
| 2021/0319104 A1* | 10/2021 | Jagannathan | .......... | G06F 3/0604 |
| 2023/0185628 A1* | 6/2023 | Lo | .......... | G06F 21/566 |
| | | | | 718/1 |
| 2023/0231881 A1* | 7/2023 | Radhakrishnan | ... | H04L 63/1425 |
| | | | | 726/23 |
| 2025/0055880 A1* | 2/2025 | Goncalves | .......... | H04L 63/1416 |

OTHER PUBLICATIONS

International Search Report and Written Opinion of International Application No. PCT/US23/75072, mail date Jan. 18, 2024, 9 pages.
Genc, et al., "On Deception-Based Protection Against Cryptographic Ransomware", Jun. 6, 2019, retrieved Jan. 25, 2024 from https://link.springer.com/chapter/10.1007/978-3-030-22038-9_11. pp. 1-21.

* cited by examiner

*Primary Examiner* — Christopher A Revak

(74) *Attorney, Agent, or Firm* — Grossman, Tucker, Perreault & Pfleger, PLLC; Donald G. Weiss

(57) ABSTRACT

In an approach to detecting and/or blocking malware attacks using decoys, one or more decoy files are created, files, where the one or more decoy files never return a read acknowledgement when read, thereby crippling at least a portion of a malware. The one or more decoy files are propagated to a system. Responsive to the malware initiating a read process on any of the one or more decoy files, the malware is detected.

20 Claims, 4 Drawing Sheets

SYSTEM AND METHOD FOR DETECTING AND/OR BLOCKING MALWARE ATTACKS USING DECOYS

CROSS-REFERENCE TO RELATED APPLICATIONS

The present application claims the benefit of the filing date of U.S. Provisional Application Ser. No. 63/377,845, filed Sep. 30, 2022, the entire teachings of which application is hereby incorporated herein by reference.

TECHNICAL FIELD

The present application relates generally to cyber security and, more particularly, to a system and method for detecting and/or blocking malware attacks using decoys.

BACKGROUND

Malware is intrusive software that may damage and/or destroy computers and computer systems, and/or obtain private information. Malware is a contraction for "malicious software." Malware is any software intentionally designed to cause disruption to a computer, server, client, or computer network, leak private information, gain unauthorized access to information or systems, deprive users access to information or which unknowingly interferes with the user's computer security and privacy. Examples of common malware includes viruses, worms, spyware, adware, and ransomware.

Ransomware is a type of malware that threatens to publish the victim's personal data or permanently block access to it unless a ransom is paid. While some simple ransomware may lock the system without damaging any files, more advanced malware, collectively called crypto-ransomware, are used to extort payment from the victim. In these instances, the ransomware encrypts the victim's files, making them inaccessible, and demands a ransom payment to decrypt them. Ransomware is a top threat to public and private organizations that cripples operations and demands large sums under the threat of losing/leaking proprietary information and personally identifiable information (PII).

In cyber security, a decoy may be used to distract cybercriminals from actual targets. The decoy, e.g., a honeypot, is a computer security mechanism set to detect, deflect, or, in some manner, counteract attempts at unauthorized use of information systems. Generally, a decoy consists of data (for example, in a network site) that appears to be a legitimate part of the site which contains information or resources of value to attackers. It is actually isolated, monitored, and capable of blocking or analyzing the attackers.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
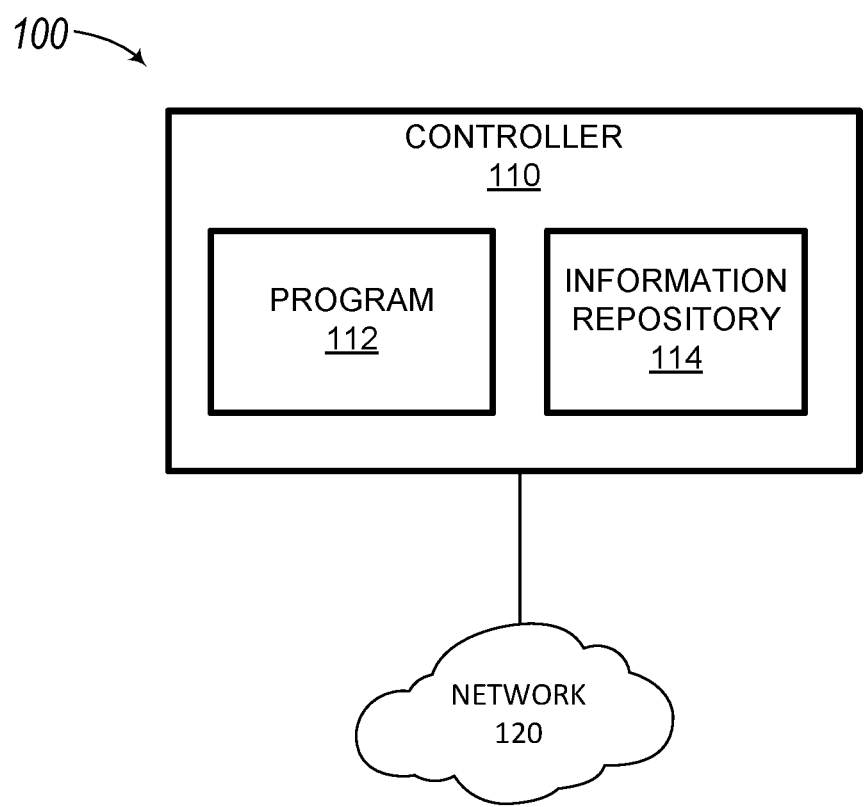
FIG. 1 is a functional block diagram illustrating a distributed data processing environment consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present disclosure, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Traditional methods to block malware attempts, such as ransomware, may include the use of honeypots that are monitored by a separate process that will expose adversarial processes when they access the honeypot file. The problem with the traditional solutions is that adversaries can detect and avoid the monitoring process. In addition, these existing honeypot methods merely provide detection notifications. There exists a need to block malware attempts that is difficult or impossible to detect and to mitigate the attack to prevent damage inflicted by the malware.

Disclosed herein is a system and computer-implemented method for detecting and/or blocking malware attacks using decoys. The disclosed system and computer-implemented method trap malware on attempts to read and prevent or delay the attacker from encrypting real files. The disclosed solutions do not require a monitoring process and are malware agnostic, and minimal resources are required from the host device. By providing early detection and/or hindering malware, the system and computer-implemented method provide valuable seconds to shut down the system and keep files from being encrypted and made inaccessible. This mitigation minimizes damage and keeps operations from being crippled. The disclosed solutions can be easily provisioned to devices prior to distribution or provided to existing users to ensure protection.

In one illustrative embodiment consistent with the present disclosure, one or more decoy files exists as first in, first out (FIFO) pipes. The data is handled in a FIFO order; thus, many systems refer to these FIFO pipes as simply FIFOs. A pipe is a mechanism for interprocess communication; data written to the pipe by one process can be read by another process. If the FIFO is empty when a process attempts to read from it, the process must wait until a write process writes a message to the same FIFO. By preventing the write process from writing to the FIFO, the controller 110 prevents the malware read process from ever completing. The one or more decoy files never return a read acknowledgement to the malware that attempts to read them, thereby crippling at least a portion of the malware, and preventing the malware from encrypting the file.

FIG. 1 is a functional block diagram illustrating a distributed data processing environment, generally designated 100, suitable for operation of the program 112 consistent with the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes controller 110 optionally connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between controller 110 and other computing devices (not shown) within distributed data processing environment 100.

Controller 110 can be a standalone computing device, a management server, a web server, a mobile computing device, or any other circuitry or computing system capable of receiving, sending, and processing data. In an embodiment, controller 110 can be a personal computer (PC), a desktop computer, a laptop computer, a tablet computer, a netbook computer, a smart phone, or any programmable electronic device capable of communicating with other computing devices (not shown) within distributed data processing environment 100 via network 120. In another embodiment, controller 110 can represent a server computing system utilizing multiple computers as a server system, such as in a cloud computing environment. In yet another embodiment, controller 110 represents a computing system utilizing clustered computers and components (e.g., database server computers, application server computers) that act as a single pool of seamless resources when accessed within distributed data processing environment 100.

In an embodiment, controller 110 includes program 112. In an embodiment, program 112 is a program, application, or subprogram of a larger program for detecting and/or blocking malware attacks using decoys in a manner consistent with the present disclosure. In an alternative embodiment, program 112 may be located on any other device accessible by controller 110 via network 120.

In an embodiment, controller 110 includes information repository 114. In an embodiment, information repository 114 may be managed by program 112. In an alternate embodiment, information repository 114 may be managed by the operating system of the controller 110, alone, or together with, program 112. Information repository 114 is a data repository that can store, gather, compare, and/or combine information. In some embodiments, information repository 114 is located externally to controller 110 and accessed through a communication network, such as network 120. In some embodiments, information repository 114 is stored on controller 110. In some embodiments, information repository 114 may reside on another computing device (not shown), provided that information repository 114 is accessible by controller 110. Information repository 114 includes, but is not limited to, decoy data, malware data, filesystem data, operating system data, system data and other data that is received by program 112 from one or more sources, and data that is created by program 112.

Information repository 114 may be implemented using any volatile or non-volatile storage media for storing information, as known in the art. For example, information repository 114 may be implemented with random-access memory (RAM), solid-state drives (SSD), one or more independent hard disk drives, multiple hard disk drives in a redundant array of independent disks (RAID), optical library, or a tape library. Similarly, information repository 114 may be implemented with any suitable storage architecture known in the art, such as a relational database, an object-oriented database, or one or more tables.

Figure 2:
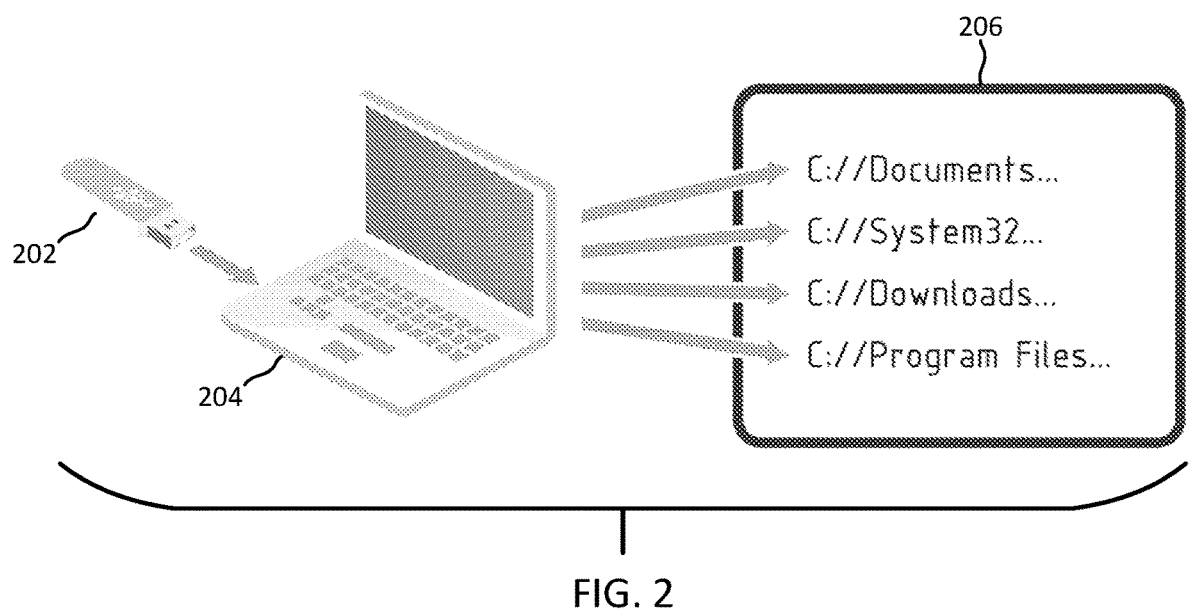
FIG. 2 is an example illustrating one possible method for a ransomware attack on a computer.

FIG. 2 is an example illustrating one possible method for a ransomware attack on a computer. In the example illustrated in FIG. 2, a memory stick 202 infected with malware is inserted into computer 204. As a result of inserting the infected memory stick into computer 204, the filesystem 206 of computer 204 is attacked by the malware. This example illustrates one possible method of infection of a computer by malware. Many other methods of infection are possible, as would be known to a person of skill in the art.

Figure 3:
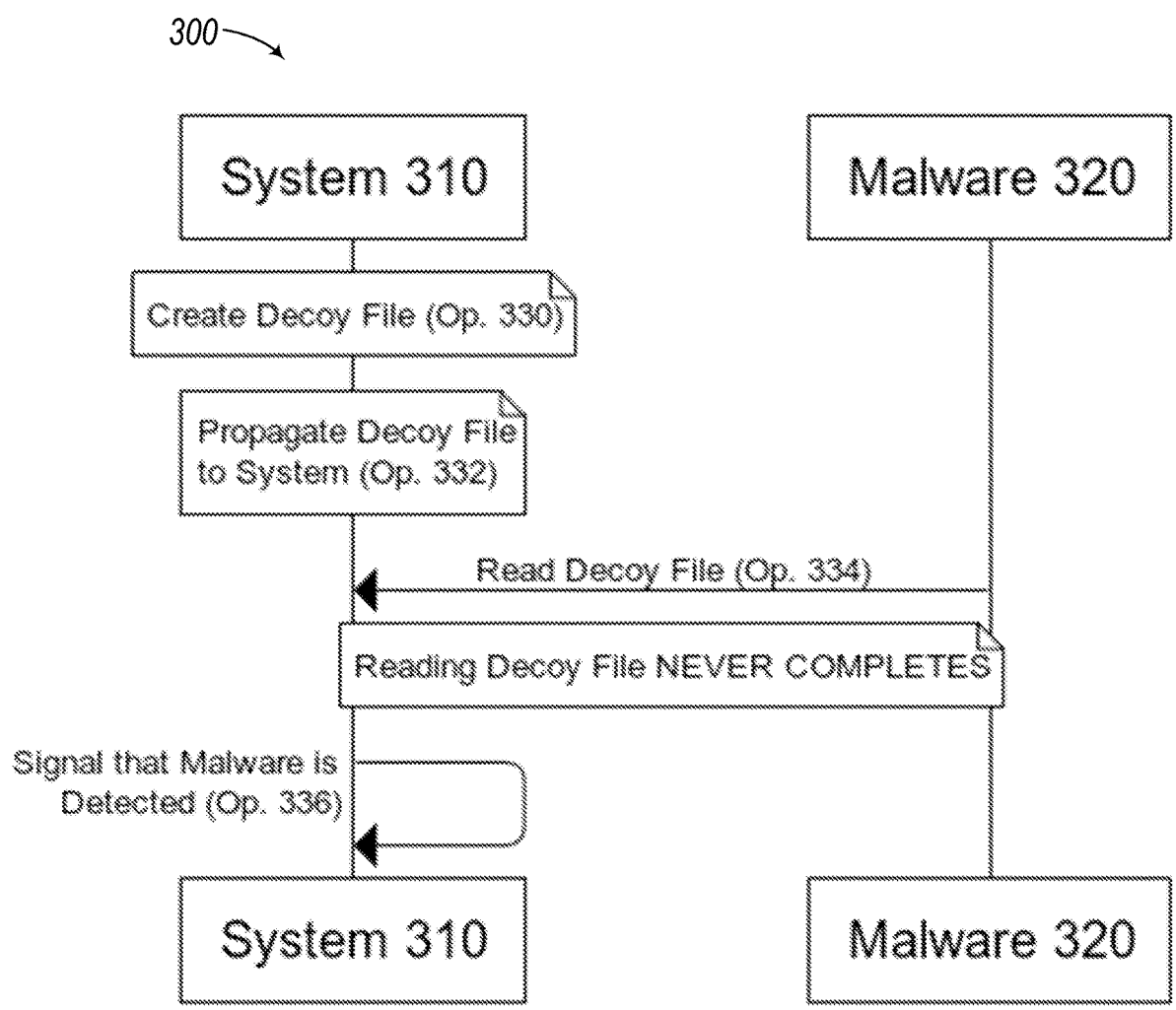
FIG. 3 is a sequence diagram depicting operations for the program for detecting and/or blocking malware attacks using decoys, on the distributed data processing environment of FIG. 1, consistent with the present disclosure.

FIG. 3 is a sequence diagram depicting operations for the program 112 on the controller 110, for detecting and/or blocking malware attacks using decoys, on the distributed data processing environment of FIG. 1, consistent with the present disclosure. In an alternative embodiment, the operations of the controller 110 may be performed by any other program while working with the controller 110.

It should be appreciated that embodiments of the present disclosure provide for detecting and/or blocking malware attacks using decoys. However, FIG. 3 provides only an illustration of one implementation and does not imply any limitations with regard to the environments in which different embodiments may be implemented. Many modifications to the depicted environment may be made by those skilled in the art without departing from the scope of the disclosure as recited by the claims.

The controller 110 creates one or more decoy files (operation 330). In the illustrated example embodiment, the controller 110 creates one or more decoy files, which exist as FIFO pipes that never return a read acknowledgement to malware that attempts to encrypt the one or more decoy files. By never returning a read acknowledgement, the controller 110 cripples a portion of the ransomware and acting as an early warning of danger to notify the user of a current attack. In this context, the term never means that a read acknowledgement is either not sent to the malware or is not sent to the malware in a timeframe sufficient for the malware to perform its intended functions. This provides an early detection for a user and hinders malware, thereby providing valuable seconds to shut down the system and prevent files from being encrypted and made inaccessible. In some embodiments, the controller 110 creates a decoy file that includes a higher-level software implementation of an object that functions as a FIFO (e.g., a python implementation).

In an embodiment, the controller 110 may include a Windows kernel driver that creates a Windows-specific FIFO, and symbolically links the decoy file to the FIFO entity. In another embodiment, the controller 110 may execute a Linux virtual machine on a Windows system and use the Linux 'make FIFO' command (mkfifo) to create the decoy files. The malware then links to these FIFO decoy files without detecting they are FIFOs or pipes.

The controller 110 propagates the one or more decoy files (operation 332). The controller 110 propagates the decoy file to the target system and may spread multiple FIFOs throughout the filesystem acting as small traps for malware to fall into (even if it is multi-process). In some embodiments, the controller 110 propagates the file to strategic locations in the filesystem of a computer. In other embodiments where the system is connected to a network, the controller 110 propagates the decoy file throughout the network. The controller 110 may propagate the decoy file in locations that are typically attacked by malware. The system may propagate multiple different decoy files to emulate different types of files that malware may attack.

The decoy files may be populated throughout the filesystem based on research and analysis of malware attacks, and the number and location of the decoy files may be optimized based on the research. The research may, for example, identify how malware reads, encrypts, etc., files to identify the checks that the malware may perform and the folders that the malware may be likely to target. This method of placement uses a probability of malware attack based on the research to determine where to populate the decoy files, as well as knowledge of the protection and sanitization the malware may employ against the decoy files.

The malware attempts to read the decoy file (operation 334). In operation 334, the malware detects and attempts to read the decoy file. In some embodiments, the decoy file may be a simple FIFO (e.g., a named pipe in Windows), which is a file that when read makes the process wait until a write process writes a message to the same FIFO. By preventing the write process from writing to the FIFO, the controller 110 prevents the malware read process from ever completing. At the same time, the act of the malware process attempting to read the decoy file will signal the controller 110 that the system is under attack, and the controller 110 can take appropriate action to prevent damage to the system. In such a configuration, the controller does not monitor the FIFO. Instead, the FIFO signals the controller of any attempt to read the FIFO.

In an embodiment, the controller 110 may include a Windows kernel driver that creates a write process that writes continuously to the FIFO and thereby prevents the malware read process from ever completing. For example, the controller 110 may include a process such as a '/dev/random' equivalent process, which is a random number generating process, to continuously generate random numbers that are written to the FIFO. Since the FIFO is continuously being written with new data, there is always more data to be read, and the read process will never complete. This prevents the malware read process from ever completing.

In some cases, the malware may check if the decoy file is a pipe or FIFO (e.g., by checking the file attributes) or if the decoy file is zero bytes in size and, if so, skip the decoy file. To avoid this case, in some embodiments, the controller 110 may create a symbolic link (symlink) to the FIFO. A symlink is not a target file, but rather is a file that specifies a path to the target file. A symlink is not a pipe and is always greater than zero bytes. For example, a symlink may be eight bytes. Therefore, the malware would not recognize the symlink as a FIFO or pipe.

In some other cases, the malware writers may follow the symlink see it directs to a pipe and skip the file. To prevent the malware in these cases, the controller 110 may include, or may consist of, a higher-level software module, e.g., a kernel module, which can create a file that acts like a FIFO but looks like a normal file.

The controller 110 signals that the malware is detected (operation 336). Once the controller 110 determines that malware has attempted to read a decoy file, the controller 110 signals that the malware is detected. In some embodiments, the controller 110 may signal a user that the malware was detected. In some embodiments, the controller 110 may shut down the system to prevent the malware from damaging the system, e.g., preventing the malware from encrypting files on the system. In some embodiments, the FIFO implementation may include a signal to start a process, or trigger an existing standard process (e.g., shutdown), which would take immediate preventative action to mitigate further damage. In other embodiments, the controller 110 may take any appropriate action as would be known to a person of skill in the art.

Figure 4:
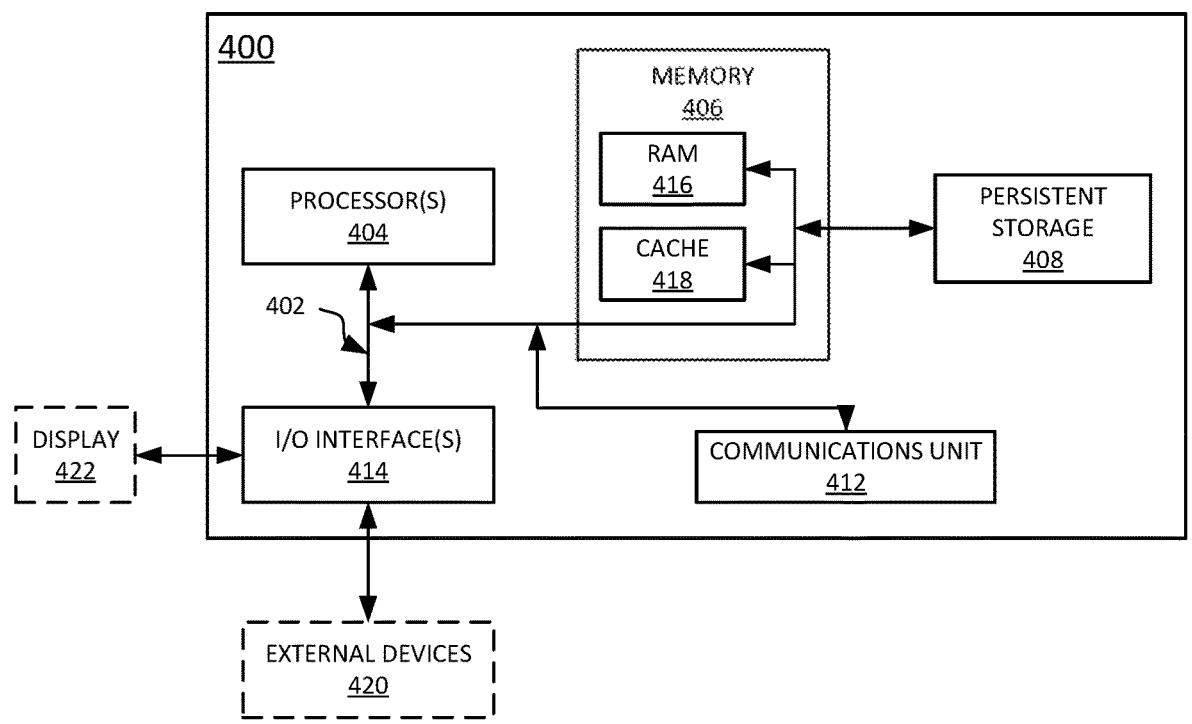
FIG. 4 depicts a block diagram of components of the computing device executing the program within the distributed data processing environment of FIG. 1, consistent with the present disclosure.

FIG. 4 is a block diagram depicting components of one example of the controller 110 suitable for the program 112, within the distributed data processing environment of FIG. 1, consistent with the present disclosure. FIG. 4 displays the computing device or controller 400, one or more processor(s) 404 (including one or more computer processors), a communications fabric 402, a memory 406 including, a random-access memory (RAM) 416 and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the controller 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a RAM 416 and a cache 418. In general, the memory 406 can include any suitable volatile or non-volatile computer readable storage media. Cache 418 is a fast memory that enhances the performance of processor(s) 404 by holding recently accessed data, and near recently accessed data, from RAM 416.

Program instructions for the program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. In the context of some embodiments of the present disclosure, the source of the various input data may be physically remote to the controller 400 such that the input data may be received, and the output similarly transmitted via the communications unit 412.

The I/O interface(s) 414 allows for input and output of data with other devices that may be connected to controller 400. For example, the I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present disclosure, e.g., the program 112, can be stored on such portable computer readable storage media and can be loaded onto persistent storage 408 via the I/O interface(s) 414. I/O interface(s) 414 also connect to a display 422.

Display 422 provides a mechanism to display data to a user and may be, for example, a computer monitor. Display 422 can also function as a touchscreen, such as a display of a tablet computer.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

According to one aspect of the disclosure, there is provided a method for detecting and/or blocking malware attacks including: creating, by one or more computer processors, one or more decoy files; propagating, by the one or more computer processors, the one or more decoy files to a system; and preventing, by the one or more computer processors, the malware from completing the read process.

According to another aspect of the disclosure there is thus provided a system for detecting and/or blocking malware attacks, the system including: one or more computer processors; one or more computer readable storage media; and program instructions stored on the one or more computer readable storage media for execution by at least one of the one or more computer processors, the stored program instructions including instructions to: create one or more decoy files; propagate the one or more decoy files to a system; and prevent the malware from completing the read process.

"Circuitry," as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including," and "having" are intended to be inclusive and mean that there may be additional elements other than the listed elements.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include one or more non-transitory computer readable storage media having computer readable program instructions thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but is not limited to, an electronic storage device, a magnetic storage device, an optical storage device, an electromagnetic storage device, a semiconductor storage device, or any suitable combination of the foregoing. A non-exhaustive list of more specific examples of the one or more non-transitory computer readable storage media includes the following: a portable computer diskette, a hard disk, a RAM, a ROM, an EPROM or Flash memory, a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from one or more non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in one or more non-transitory computer readable storage media within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in one or more non-transitory computer readable storage media that can direct a computer, a programmable data processing apparatus, and/or other devices to function in a particular manner, such that the one or more non-transitory computer readable storage media having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for detecting and blocking malware attacks, the method comprising:
   creating, by one or more computer processors, one or more decoy files, wherein:
      the one or more decoy files never return a read acknowledgement when read, thereby crippling at least a portion of a malware;
   propagating, by the one or more computer processors, the one or more decoy files to a system; and
   responsive to the malware initiating a read process on any of the one or more decoy files, detecting, by the one or more computer processors, the malware without requiring a monitoring process.

2. The method of claim 1, further comprising:
   detecting, by the one or more computer processors, that the malware has attempted to read any of the one or more decoy files; and
   signaling, by the one or more computer processors, to the system that the malware has been detected.

3. The method of claim 1, wherein each of the one or more decoy files is a first in, first out (FIFO) pipe, wherein each of the FIFOs is empty.

4. The method of claim 3, wherein any of the one or more decoy files are a symbolic link (symlink) to the FIFO.

5. The method of claim 3, wherein creating the one or more decoy files further comprises:
creating, by the one or more computer processors, a software module in an operating system; and
creating, by the one or more computer processors, the FIFO using the software module in the operating system.

6. The method of claim 3, wherein creating the one or more decoy files further comprises:
creating, by the one or more computer processors, a Linux virtual machine on a Windows system; and
creating, by the one or more computer processors, the FIFO using a make FIFO command (mkfifo) of the Linux virtual machine.

7. The method of claim 3, wherein responsive to detecting that the malware has initiated the read process on any of the one or more decoy files, detecting the malware further comprises:
preventing, by the one or more computer processors, any write process from writing to the FIFO to leave the FIFO empty, wherein the read process cannot complete while the FIFO is empty.

8. The method of claim 3, wherein responsive to detecting that the malware has initiated the read process on any of the one or more decoy files, detecting the malware further comprises:
creating, by the one or more computer processors, a write process that writes continuously to the FIFO, wherein the read process cannot complete due to the write process continuously writing to the FIFO.

9. The method of claim 1, wherein the one or more decoy files are propagated based on research and analysis of the malware attacks.

10. The method of claim 9, wherein a number and location of the decoy files may be optimized based on the research and the analysis of the malware attacks.

11. A system for detecting and/or blocking malware attacks, the system comprising:
one or more computer processors;
one or more computer readable storage media; and
program instructions stored on the one or more computer readable storage media for execution by at least one of the one or more computer processors, the stored program instructions including instructions to:
create one or more decoy files, wherein the one or more decoy files never return a read acknowledgement when read, thereby crippling at least a portion of a malware;
propagate the one or more decoy files to a target system; and
responsive to the malware initiating a read process on any of the one or more decoy files, detect the malware without requiring a monitoring process.

12. The system of claim 11, further comprises one or more of the following program instructions, stored on the one or more computer readable storage media, to:
detect that the malware has attempted to read any of the one or more decoy files; and
signal to the system that the malware has been detected.

13. The system of claim 11, wherein each of the one or more decoy files is a first in, first out (FIFO) pipe, wherein each of the FIFOs is empty.

14. The system of claim 13, wherein each of the one or more decoy files are a symbolic link (symlink) to the FIFO.

15. The system of claim 13, wherein create the one or more decoy files further comprises one or more of the following program instructions, stored on the one or more computer readable storage media, to:
create a software module in an operating system; and
create the FIFO using the software module in the operating system.

16. The system of claim 13, wherein create the one or more decoy files further comprises one or more of the following program instructions, stored on the one or more computer readable storage media, to:
create a Linux virtual machine on a Windows system; and
create the FIFO using a make FIFO command (mkfifo) of the Linux virtual machine.

17. The system of claim 13, wherein responsive to detecting that the malware has initiated the read process on any of the one or more decoy files, detect the malware further comprises one or more of the following program instructions, stored on the one or more computer readable storage media, to:
prevent a write process from writing to the FIFO to leave the FIFO empty, wherein the read process cannot complete due to the FIFO is empty.

18. The system of claim 13, wherein responsive to detecting that the malware has initiated the read process on any of the one or more decoy files, detect the malware further comprises one or more of the following program instructions, stored on the one or more computer readable storage media, to:
create a write process that writes continuously to the FIFO, wherein the read process cannot complete due to the write process continuously writing to the FIFO.

19. The system of claim 11, wherein the one or more decoy files are propagated based on research and analysis of the malware attacks.

20. The system of claim 19, wherein a number and location of the decoy files may be optimized based on the research and the analysis of the malware attacks.

* * * * *